United States Patent Office 3,361,235
Patented Jan. 2, 1968

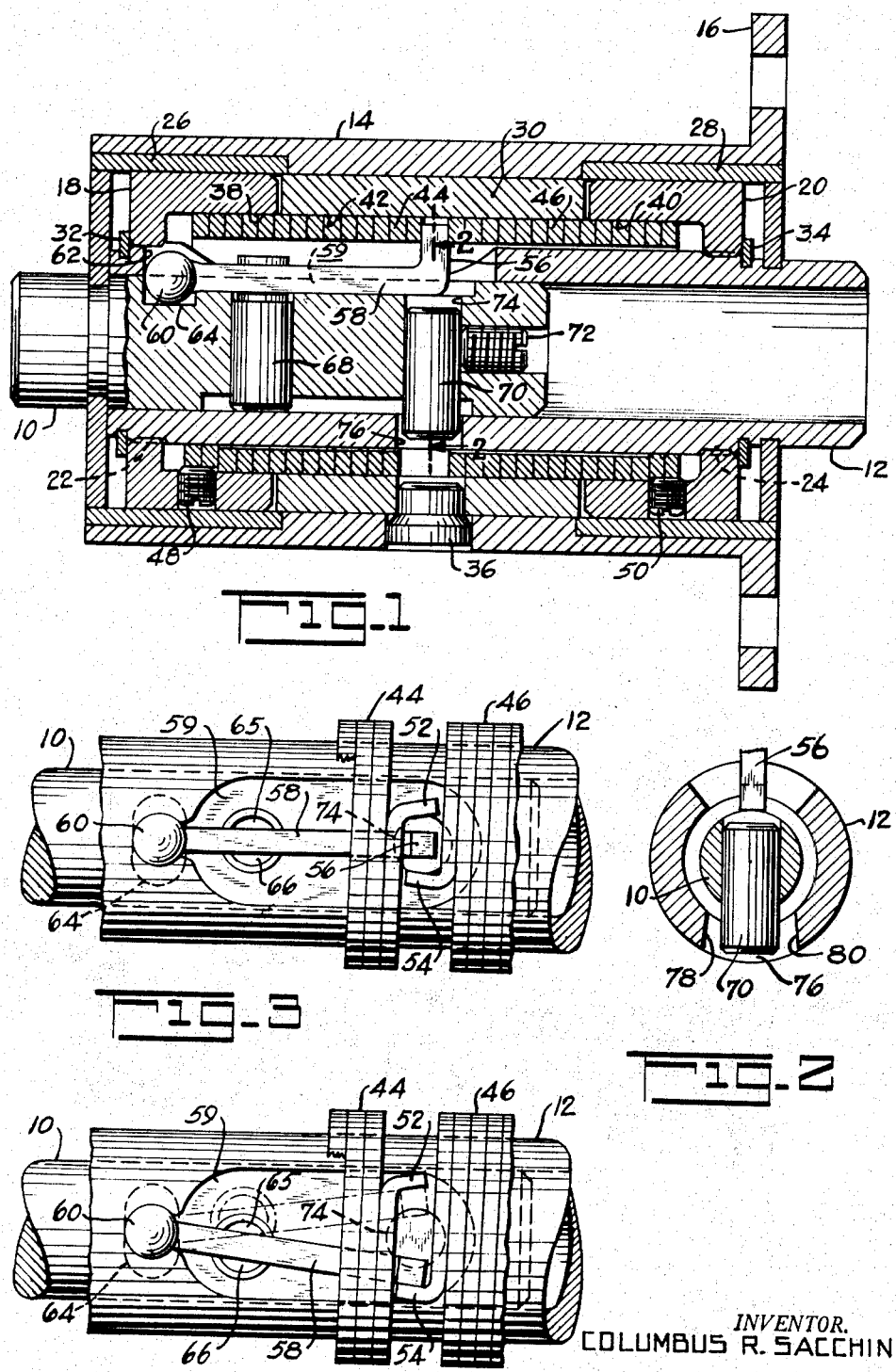

3,361,235
BIDIRECTIONAL NO-BACK SPRING CLUTCH
Columbus R. Sacchini, Willowick, Ohio, assignor to Curtiss-Wright Corporation, a corporation of Delaware
Filed June 22, 1966, Ser. No. 559,539
7 Claims. (Cl. 192—8)

My invention relates to bidirectional no-back spring clutches, that is, spring clutches of the type permitting an input shaft to drive an output shaft bidirectionally but effectively preventing the transmission of torque regardless of direction from the output shaft to the input shaft. Examples of such clutches may be found in United States Patents 2,458,441, 2,927,551 and 2,946,417.

In clutches of the kind mentioned, the output shaft is prevented from rotating in the absence of a driving torque on the input shaft by helical spring means which grounds the output shaft to fixed structure. Upon the application of torque to the input shaft, the spring means is released from the fixed structure and the output shaft is then engaged by a pin driven by the input shaft to provide for the transmission of power from the input to the output shaft. A difficulty is encountered with such clutches due to the fact that release of the spring means from the fixed structure must be accompanied by substantial relative movement of the input shaft with respect to the output shaft to assure that coils of the spring means are moved a sufficient distance from the fixed structure to prevent them from subsequently binding against the fixed structure (due, for example, to a decrease in load on the output shaft) and causing power to be interrupted, possibly with damage to the clutch; and while it is desirable in the design of such clutches to provide for the large relative movement of input and output shafts needed for high reliability, the sensitivity of the clutch suffers in the extent to which any relative movement of the shafts is permitted.

It is a prime object of the invention to provide means for improving both the sensitivity and reliability of bidirectional no-back spring clutches.

It is another object of the invention to improve the construction of bidirectional no-back spring clutches so as to simplify their assembly and disassembly.

Other objects and advantages of the invention will become apparent during a reading of the specification taken in connection with the accompanying drawings wherein:

FIG. 1 is a vertical, longitudinal, sectional view taken through the clutch of the invention;

FIG. 2 is a cross-sectional view taken on the plane of the line 2—2 of FIG. 1;

FIG. 3 is a plan view showing the actuating mechanism of the clutch of FIG. 1; and FIG. 4 is a view similar to FIG. 3 showing the clutch actuating arm in positions contacting spring means of the clutch.

Referring to the drawings, reference character 10 designates an input shaft and reference character 12 a hollow output shaft, the input shaft being coaxial with and piloted in the output shaft as shown. The input and output shafts are surrounded by a cylindrical housing 14 which includes a flange 16 for securing the housing to fixed structure in the environment where the clutch is to be used. The output shaft is provided with collars 18 and 20 which are splined thereto at 22 and 24, respectively. Such collars support the output shaft on bearings 26 and 28 for rotation in the housing. The collars 18 and 20 are axially located in assembled positions next to a sleeve 30 by snap rings 32 and 34, the sleeve 30 being affixed to housing 14 by plug 36. The collars 18 and 20 have inner surfaces 38 and 40, respectively, with diameters corresponding to the diameter of inner surface 42 of sleeve 30.

A pair of correspondingly wound helical springs, such as left-handed springs 44 and 46, are provided to lock the output shaft against rotation in the absence of torque on the input shaft. Such springs are formed with an outside diameter slightly greater than the diameters of surfaces 38, 40 and 42 to interfere with the inner surfaces 38 and 40 of the collar 18 and with the inner surface 42 of sleeve 30. Each of the springs is effectively secured at one end to the output shaft 12 by a set screw which enforces tight engagement of end coils with the shaft, spring 44 being secured to shaft 12 by set screw 48 and spring 46 being secured to the shaft by set screw 50. The springs 44 and 46 extend toward each other from their secured ends and terminate at free ends in tangs 52 and 54 disposed on opposite sides of the end portion 56 of an arm 58. The springs are effective to fix the position of the output shaft in the absence of a driving torque on the input shaft, since any torque on the output shaft results in grounding the output shaft through one or the other of the springs 44 and 46 to fixed sleeve 30. A torque acting in a clockwise direction on the output shaft (as viewed from the output end of the clutch) tends to expand spring 44 and tightens the spring against the inner surfaces of collar 18 and fixed sleeve 30 to prevent the output shaft from rotating, whereas a torque acting in the opposite direction on the output shaft tends to expand spring 46 and tightens such spring against the inner surfaces of collar 20 and fixed sleeve 30 to prevent the shaft from rotating.

Arm 58 is located in an elongated opening 59 in the output shaft 12 and has a ball 60 at one end that pivotally mounts the arm in a cylindrical socket 62 which extends through output shaft 12. The ball 60 protrudes through the socket and rests in an arcuate slot 64 in the input shaft 10. The arm 58 is embraced by the bifurcated end portions 65 and 66 of a turnable pin 68 which tends through the input shaft 10. The arm is pivotable on the ball 60 in socket 62 by the pin 68 upon movement of the input shaft relative to the output shaft and any movement imparted to the arm at the pin is amplified at end portion 56 which is disposed for engagement with the tangs 52 and 54. A pin 70 affixed by a set screw 72 in a hole 74 in the input shaft 10 projects into an elongated slot 76 which extends through the output shaft 12. Such pin is provided to drivably connect the input and output shafts upon engagement with either end 78 or 80 of the slot. The pin 70 lies midway between the ends 78 and 80 of the slot 76 when end portion 56 of arm 58 is equally distant from tangs 52 and 54, and the length of slot 76 is such that upon movement of arm 58, end portion 56 engages one or the other of the tangs 52 or 54 and winds the engaged spring away from fixed sleeve 30 before pin 70 engages on the end of slot 76 to positively connect the input and output shafts.

Assuming a torque is applied to shaft 10 in a counterclockwise direction (looking at the input end of the clutch), arm 58 is pivoted counterclockwise as viewed in FIGS. 3 and 4 by the pin 68 to cause end portion 56 of the arm to engage tang 52 of spring 44. The spring 44 is contracted by the arm 58 unlocking the output shaft 12 for rotation in the direction of the torque applied to the input shaft, and thereafter pin 70 is caused to engage end 78 of the slot 76 whereupon a positive driving connection is established between the input and output shafts and the output shaft is rotated by the input shaft. Spring 46 overruns inner surface 42 of sleeve 30. If a torque is applied to shaft 10 in the opposite direction, arm 58 is pivoted clockwise as seen in FIGS. 3 and 4 by pin 68 to cause end portion 56 of the arm to engage tang 54 of spring 46. Spring 46 is contracted by arm 58 and the output shaft 12 is thereby unlocked for rotation in the direction of rotation of the input shaft. After the spring 46 has been contracted, pin 70 engages end 80 of the slot and drives the output shaft 12 in the direction of rotation of input shaft 10. Spring 44 overruns the inner surface of sleeve 30.

Because of the amplification by the arm 58 of movements imparted to the arm by pin 68, only a slight rotational movement of the input shaft 10 is required to actuate one or the other of the springs 44 or 46 so as to unlock the output shaft 12 for rotation in a particular direction and to contract the spring sufficiently to eliminate the possibility of the spring being caused to re-engage and bind against the fixed sleeve 30 with resulting damage to the clutch in response to a decrease in transmitted torque. Preferably, the pin 68 is located so as to engage the arm 58 close to the ball 60, since the amplifying effect of the arm 58 is thereby enhanced. In addition to being inherently sensitive and reliable in operation, the clutch of the invention is uniquely adapted to facilitate assembly and disassembly by reason of the construction already described, in particular, by the use of splines at 22 and 24, and snap rings 32 and 34 for locating the collars 18 and 20 on the output shaft, and by the simple manner in which the springs are affixed to the output shaft, that is, with the set screws 48 and 50.

While only one form of the clutch of the invention has been shown in the accompanying drawings and described herein, it will be apparent to those skilled in the art that various changes and modifications may be made therein without departing from the spirit and scope of the invention as defined in the annexed claims.

I claim:

1. In a spring clutch the combination comprising an input shaft; an output shaft; fixed structure; a helical spring secured at one end for rotation with the output shaft and free at the other end, the spring having an interference fit with the fixed structure to thereby lock the output shaft against rotation in one direction; an arm pivotally mounted on the output shaft; means on the input shaft to pivot the arm upon rotation in said one direction of the input shaft and thereby cause the arm to engage the free end of the spring at a location which is a greater distance from the pivotal axis of the arm than the pivoting means whereby the spring is actuated to unlock the output shaft from the fixed structure; and means rotatable by the input shaft to engage the output shaft and produce rotation of the output shaft when unlocked from the fixed structure.

2. A spring clutch as defined in claim 1 wherein the arm pivotally mounts at one end on the output shaft, the other end of the arm is disposed for engagement with the free end of the spring, and the arm actuating means is disposed to act against the arm at a location closer to the pivotally mounted end of the arm than the other end.

3. A spring clutch as defined in claim 1 wherein the fixed structure includes an inner cylindrical surface, the output shaft is rotatably mounted within the fixed structure and the interference fit of the spring is with the said inner surface.

4. A spring clutch comprising an input shaft; an output shaft; fixed structure; a pair of helical springs having an interference fit with the fixed structure, each such spring being secured at one end for rotation with the output shaft and free at the other end, the springs extending from their secured ends toward each other and being of the same hand to lock the output shaft against rotation; an arm pivotally mounted on the output shaft; means on the input shaft to pivot the arm upon rotation in one direction or another of the input shaft and thereby cause the arm to engage the free end of one spring or the other at a location which is a greater distance from the pivotal axis of the arm than the pivoting means whereby the engaged spring is actuated to unlock the output shaft for rotation in the direction of rotation of the input shaft; and means rotatable by the input shaft to engage and drive the output shaft when unlocked for rotation in one direction or the other.

5. A spring clutch as defined in claim 4 wherein the pivoting means is a turnable pin mounted in the input shaft and in contact with the arm.

6. A spring clutch as defined in claim 5 wherein the output shaft includes an elongated opening which receives the pivotally mounted arm.

7. A clutch as defined in claim 4 wherein the fixed structure is a sleeve, and the clutch includes a collar at each end of the sleeve splined to the output shaft for rotation with the output shaft, removable means on the input shaft for holding the collars in positions next to the sleeve, and means for removably securing each spring at the said one end to a collar for rotation with the output shaft.

No references cited.

CARLTON R. CROYLE, *Primary Examiner.*

C. M. LEEDOM, *Assistant Examiner.*